Dec. 27, 1949 N. CONCORDET 2,492,785
TERRESTRIAL GLOBES
Filed June 14, 1946 2 Sheets-Sheet 1
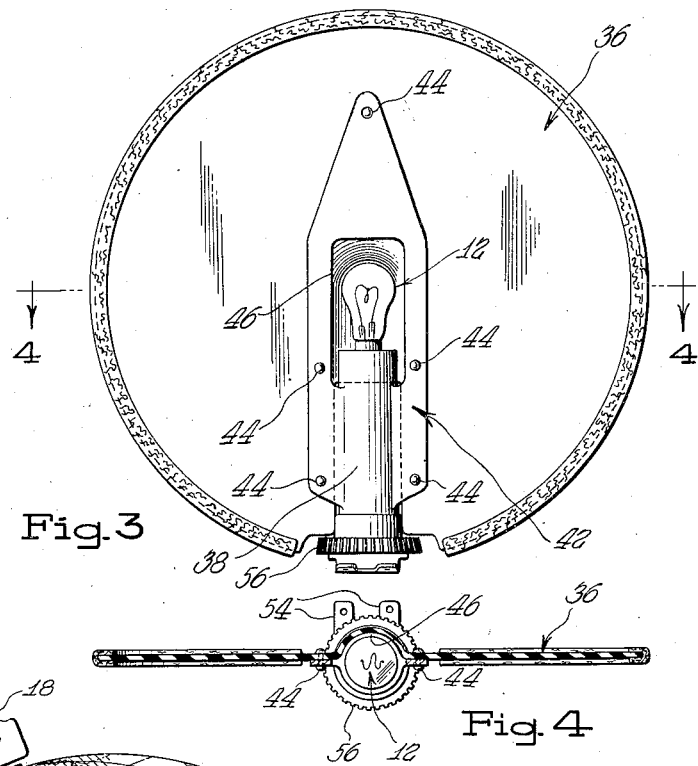
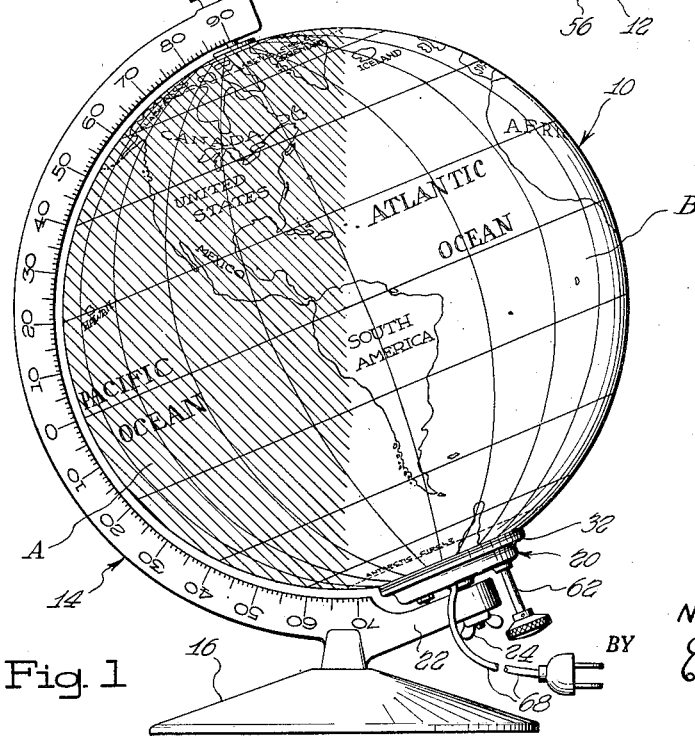
INVENTOR.
NOEL CONCORDET
BY
Edwin Lensohn
ATTORNEY Dec. 27, 1949  N. CONCORDET  2,492,785
TERRESTRIAL GLOBES
Filed June 14, 1946  2 Sheets-Sheet 2

INVENTOR.
NOEL CONCORDET
BY
ATTORNEY

Patented Dec. 27, 1949

2,492,785

UNITED STATES PATENT OFFICE 2,492,785

TERRESTRIAL GLOBE

Noel Concordet, Washington, D. C.

Application June 14, 1946, Serial No. 676,816

16 Claims. (Cl. 35—46)

1

The present invention relates to terrestrial globes.

The primary object of the invention is to provide a terrestrial globe, that is a globe which simulates the terrestrial sphere or earth, with means for simulating the illumination of the earth by the sun at any time during the rotation or planetary movement of the earth around the sun during the year and at any time during the rotation of the earth about its own polar axis.

The above and other objects, features and advantages of the invention will be fully understood from the following description with reference to the accompanying illustrative drawings.

In the drawings:

Fig. 1 is a side view, in elevation, of a terrestrial globe embodying the present invention;

Fig. 3 is a side view of a device within the globe as seen from the right in Fig. 2;

Fig. 4 is a sectional view on the line 4—4 of Fig. 3;

Figure 2:
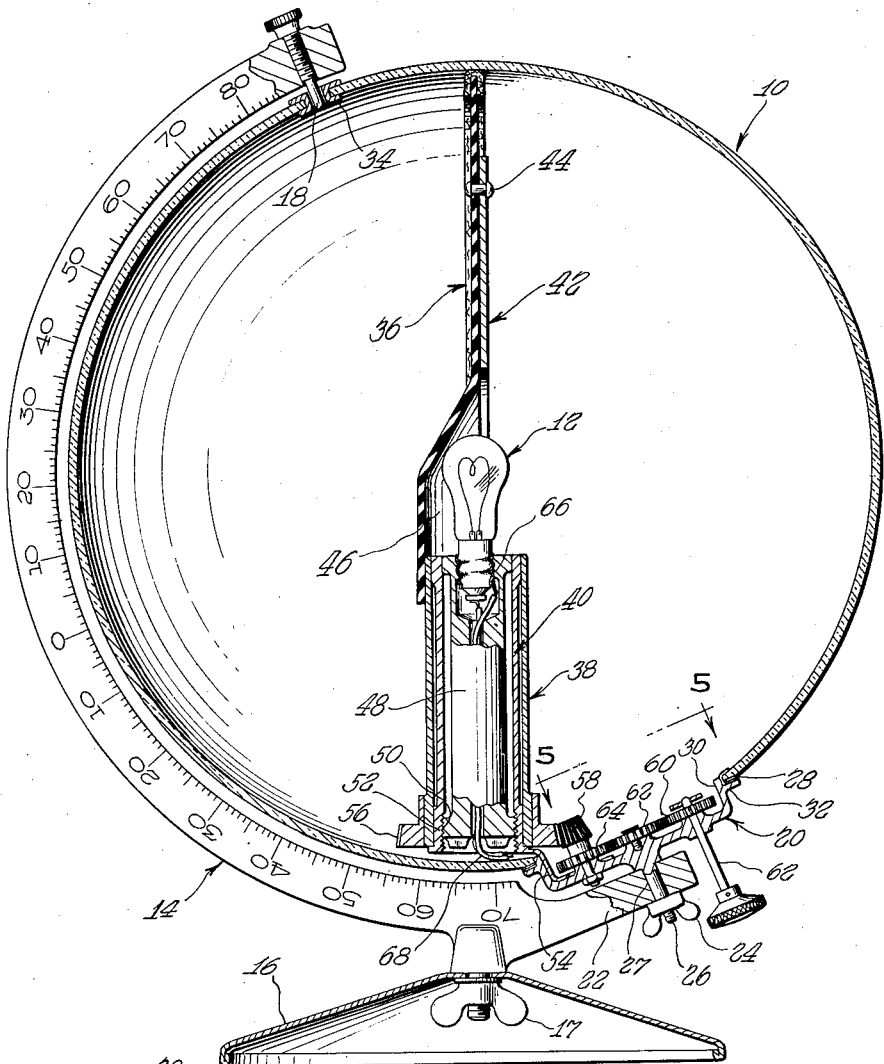
Fig. 2 is a central vertically sectional view thereof.

Referring now to the drawings in detail, the globe 10 which simulates the terrestrial sphere is hollow and translucent so that a light 12 (Fig. 2) illuminates the outer surface of the globe on which is depicted the earth's surface in a conventional manner. Said globe may be formed of any suitable material but is preferably formed of glass. The globe 10 is mounted for rotation about its polar axis on a frame 14 carried by a base 16, said polar axis being inclined to a vertical axis at an angle of 23° 27'. Frame 14 is secured to base 16 in any suitable way, as by a wing nut 17. The means for mounting said globe for rotation about its polar axis on frame 14 comprises an adjustable spindle 18 carried by the upper part of frame 14 and a stationary disk 20 removably secured to the arm 22 of said frame in any suitable way as by a nut 24 which engages a threaded pin 26 fixed to said disk and received in an opening 27 in said arm. The globe is provided with a circular opening 28 which is concentric with the polar axis of the globe, and said disk is provided with a circular flange 30 and with a laterally projecting annular flange 32, the edge of opening 28 encircling flange 30 with slight clearance and said globe resting on annular flange 32. It will be understood that pin 18 which fits within an opening 34 in the globe at one end of its polar axis releasably holds the globe in position on flange 32 of disk 20 and that said pin and flange

2

30 of the disk guide the globe for rotation about its polar axis.

An opaque screen 36 is disposed within the globe and is mounted for rotation about a vertical axis which is disposed at the center of the globe, the angle between said vertical axis and the polar axis of the globe being 23° 27'. Said screen, in each position thereof, divides the interior of the globe into two chambers. Said screen is of the same diameter as the diameter of the inner surface of the globe at a great circle thereof and provides a light-seal between the two chambers, in each position of the screen, so that the light 12 illuminates only one of said chambers and the corresponding surface of the globe, while the other chamber and the corresponding surface of the globe is not illuminated by said light.

The screen 36 is carried by a movable member 38 which is mounted for rotation about a stationary member 40, and as here shown said movable member 38 is provided with the projecting part 42 to which the screen is secured in any suitable way as by rivets 44. As shown in Figs. 2 and 3 the screen is provided with a recess 46 to receive the light 12. Said light is carried by a member 48 which is removably secured within the stationary vertical member 40 in any suitable way as by the threaded end portion 50 on member 48 which engages the internally screwthreaded end portion 52 of member 40. The vertical supporting member 40 is carried by bracket arms 54 which are fixed to disk 20 and to said supporting member 48. It will be observed that the light is stationary and that the screen is rotatable around the light.

Provision is made for rotating the screen 36 about the vertical axis by rotating member 38 to which said screen is fastened. For this purpose said member 38 is provided with a gear 56 fixed thereto at its lower end in position to be operated by a gear 58 which forms part of a set of gears carried by disk 20 and mounted for rotation thereon. The other gears of said set includes a gear 60 which is rotated by a knob operated stem 62 accessible externally of the globe, a gear 62 which meshes with gear 60, and a gear 64 which meshes with gear 62 and drives gear 58 which in turn operates gear 56 for rotating the screen carrying member 38.

Figure 5:
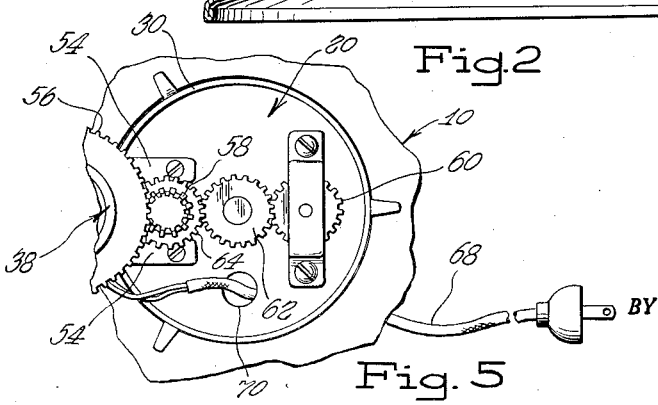
Fig. 5 is a plan view of part of the mechanism as viewed on the line 5—5 of Fig. 2.

The socket 66 for the electric lamp or light 12 may be connected to a source of electric current by the cord 68 which passes into the globe through an opening 70 (Fig. 5) provided in disk 20 and through an opening in member 48 which carries the lamp socket and the lamp or light 12. Lamp 12 can be removed from the globe and replaced by another lamp without removing the screen from the globe. This may be accomplished by removing the globe 10 from the frame 14 together with disk 20 and by moving said globe in relation to member 40 whereby to bring the opening 28 of the globe in axial alignment with member 48 so that the latter can be unscrewed from member 40 and then withdrawn through opening 28 to permit the lamp 12 to be replaced by another lamp after which member 48 carrying the new lamp can be inserted through opening 28 and secured in member 40.

The screen 36 is constructed so that it can be inserted into the globe through the opening 28 thereof. For this purpose said screen is made of flexible material, such as rubber, so that it can be rolled or folded around member 38 axially thereof thereby being contractable to a size sufficiently small to enable it to be inserted through said opening into the globe or withdrawn out of the globe through said opening together with member 38 and the supporting member 40. It will be understood that screen 36 is sufficiently resilient or flexible, being preferably formed as stated of flexible rubber or other material having the requisite properties, whereby said screen automatically assumes its flat disklike formation in light-sealing relation within the globe when said screen is disposed within the globe.

The operation of the invention is believed to be obvious from the above description. It may be noted, however, that when lamp 12 is illuminated the rotation of the screen 36 about the vertical axis in relation to the globe results in the simulation of the planetary motion of the earth around the sun, while the rotation of the earth about its axis is simulated by the rotation of the globe 10 about its polar axis. In Fig. 1 the surface portion of the earth which is not illuminated by the sun is indicated by the shaded area A, the interior chamber of the globe 10 which corresponds to said shaded area being dark. The portion of the earth which is illuminated by the sun, in the particular planetary position of the earth and the particular position of the earth about its own axis is indicated by the unshaded area B in Fig. 1, which is illuminated by the light in the chamber. It will be understood that the shaded and unshaded surface portions of the globe 10, vary with the position to which the screen is moved by turning said screen about the vertical axis as explained above for simulating the relation of the earth to the sun as the result of the planetary motion of the earth, and also it will be understood that the shaded and unshaded areas of the surface of the globe will vary in accordance with the movement of the globe 10 about its polar axis corresponding to the polar axis of the terrestrial sphere representing the relation of the earth to the sun during the rotation of the earth about its polar axis.

It will be understood that various changes in the details of construction and in the arrangement of parts of the device embodying the present invention may be made without departing from the underlying idea or principles of the invention within the scope of the appended claims.

Having thus described my invention, what I claim and desire to secure by Letters Patent is:

1. In a device of the character described comprising a hollow translucent globe simulating the terrestrial sphere, said globe being mounted for rotation about its inclined polar axis; a movable opaque screen positioned within said globe and mounted for rotation therein about a vertical axis at the center of the globe, said screen dividing the interior of the globe into two chambers in each position of the screen and forming a light seal between said chambers, and a light source positioned in said globe at one side of said screen and mounted independently thereof so that said screen is movable on its axis about said light source whereby the latter illuminates only one of said chambers.

2. In a device of the character described comprising a hollow translucent globe simulating the terrestrial sphere, said globe being mounted for rotation about its inclined polar axis; a movable opaque screen positioned within said globe and mounted for rotation therein about a vertical axis at the center of the globe, said screen dividing the interior of the globe into two chambers in each position of the screen and forming a light seal between said chambers, and a light source positioned in said globe at one side of said screen and mounted so that said screen is movable on its axis about said light source whereby the latter illuminates only one of said chambers, said globe having an opening at one end of said polar axis thereof and said screen and light source being insertable into said globe through said opening, said opening being smaller than said screen and said screen being formed of flexible material whereby it is contractable to a size sufficiently small to enable it to be inserted through said opening, said screen being resiliently expansible automatically within the globe to form said light seal.

3. In a device of the character described comprising a hollow translucent globe simulating the terrestrial sphere, said globe being mounted for rotation about its inclined polar axis; a movable opaque screen positioned within said globe and mounted for rotation therein about a vertical axis at the center of the globe, said screen dividing the interior of the globe into two chambers in each position of the screen and forming a light seal between said chambers, and a light source positioned in said globe at one side of said screen and mounted so that said screen is movable on its axis about said light source whereby the latter illuminates only one of said chambers, said globe having an opening at one end of said polar axis thereof and said light source being provided with a mounting part independent of the screen mounting, said part being insertable into said globe and removable therefrom through said opening whereby said light source is insertable into said globe and removable therefrom while said screen is disposed within the globe.

4. In a device of the character described comprising a hollow translucent globe simulating the terrestrial sphere, said globe being mounted for rotation about its inclined polar axis; a movable opaque screen positioned within said globe and mounted for rotation therein about a vertical axis at the center of the globe, said screen dividing the interior of the globe into two chambers in each position of the screen and forming a light seal between said chambers, and a light source positioned in said globe at one side of said screen and mounted so that said screen is movable on its axis about said light source whereby the latter illuminates only one of said chambers, said globe having an opening at one end of said polar axis thereof and said screen and light source being insertable into said globe through said opening, said opening being smaller than said screen and said screen being formed of flexible material whereby it is contractable to a size sufficiently small to enable it to be inserted through said opening, said screen being resiliently expansible automatically within the globe to form said light seal, said light source being provided with a mounting part independent of the screen mounting, said part being insertable into said globe and removable therefrom through said opening whereby said light source is insertable into said globe and removable therefrom while said screen is disposed within the globe.

5. In a device of the character described comprising a hollow translucent globe simulating the terrestrial sphere, said globe being mounted for rotation about its inclined polar axis; a movable opaque screen positioned within said globe and mounted for rotation therein about a vertical axis at the center of the globe, said screen dividing the interior of the globe into two chambers in each position of the screen and forming a light seal between said chambers, and a light source positioned in said globe at one side of said screen and mounted independently thereof so that said screen is movable on its axis about said light source whereby the latter illuminates only one of said chambers, and means accessible externally of the globe for turning said screen about said vertical axis.

6. In a device of the character described comprising a hollow translucent globe simulating the terrestrial sphere, said globe being mounted for rotation about its inclined polar axis; a movable opaque screen positioned within said globe and mounted for rotation therein about a vertical axis at the center of the globe, said screen dividing the interior of the globe into two chambers in each position of the screen and forming a light seal between said chambers, and a light source positioned in said globe at one side of said screen and mounted so that said screen is movable on its axis about said light source whereby the latter illuminates only one of said chambers, said globe having an opening at one end of said polar axis thereof and said screen and light source being insertable into said globe through said opening, said opening being smaller than said screen and said screen being formed of flexible material whereby it is contractable to a size sufficiently small to enable it to be inserted through said opening, said screen being resiliently expansible automatically within the globe to form said light seal, and means accessible externally of the globe for turning said screen about said vertical axis.

7. In a device of the character described comprising a hollow translucent globe simulating the terrestrial sphere, said globe being mounted for rotation about its inclined polar axis; a movable opaque screen positioned within said globe and mounted for rotation therein about a vertical axis at the center of the globe, said screen dividing the interior of the globe into two chambers in each position of the screen and forming a light seal between said chambers, and a light source positioned in said globe at one side of said screen and mounted in such relation thereto that said light source illuminates only one of said chambers, said light source being provided with a mounting part independent of the screen mounting, said part being insertable into said globe and removable therefrom whereby said light source is insertable into said globe and removable therefrom while said screen is disposed within the globe.

8. In a device of the character described comprising a hollow translucent globe simulating the terrestrial sphere, said globe being mounted for rotation about its inclined polar axis; a movable opaque screen positioned within said globe and mounted for rotation therein about a vertical axis at the center of the globe, said screen dividing the interior of the globe into two chambers in each position of the screen and forming a light seal between said chambers, and a light source positioned in said globe at one side of said screen and mounted in such relation thereto that said light source illuminates only one of said chambers, said globe having an opening at one end of said polar axis thereof and said screen and light source being insertable into said globe through said opening, said opening being smaller than said screen and said screen being formed of flexible material whereby it is contractable to a size sufficiently small to enable it to be inserted through said opening, said screen being resiliently expansible automatically within the globe to form said light seal.

9. In a device of the character described comprising a hollow transulcent globe simulating the terrestrial sphere, said globe being mounted for rotation about its inclined polar axis; a movable opaque screen positioned within said globe and mounted for rotation therein about a vertical axis at the center of the globe, said screen dividing the interior of the globe into two chambers in each position of the screen and forming a light seal between said chambers, and a light source positioned in said globe at one side of said screen and mounted in such relation thereto that said light source illuminates only one of said chambers, said globe having an opening at one end of said polar axis thereof and said screen and light source being insertable into said globe through said opening, said opening being smaller than said screen and said screen being formed of flexible material whereby it is contractable to a size sufficiently small to enable it to be inserted through said opening, said screen being resiliently expansible automatically within the globe to form said light seal, said light source being provided with a mounting part independent of the screen mounting, said part being insertable into said globe and removable therefrom whereby said light source is insertable into said globe and removable therefrom while said screen is disposed within the globe.

10. In a device of the character described comprising a hollow translucent globe simulating the terrestrial sphere, said globe being mounted for rotation about its inclined polar axis; a movable opaque screen positioned within said globe and mounted for rotation therein about a vertical axis at the center of the globe, said screen dividing the interior of the globe into two chambers in each position of the screen and forming a light seal between said chambers, and a light source positioned in said globe at one side of said screen and mounted in such relation thereto that said light source illuminates only one of said chambers, said light source being provided with a mounting part independent of the screen mounting, said part being insertable into said globe and removable therefrom whereby said light source is insertable into said globe and removable therefrom while said screen is disposed within the globe, and means accessible externally of the globe for turning said screen around said lamp.

11. In a device of the character described comprising a hollow translucent globe simulating the terrestrial sphere, said globe being mounted for rotation about its inclined polar axis; a stationary vertical member disposed within the globe at the central vertical axis thereof; a movable member mounted for rotation on said stationary member about said vertical axis; an opaque screen carried by said movable member and movable therewith about said vertical axis, said screen dividing the interior of the globe into two chambers in each position of the screen and forming a light seal between said chambers; and a light source positioned in said globe at one side of said screen and mounted on said stationary member so that said screen is movable on its axis about said light source whereby the latter illuminates only one of said chambers, and means accessible externally of the globe for turning said screen about said vertical axis, said screen-turning means being operatively connected to said movable member.

12. In a device of the character described comprising a hollow translucent globe simulating the terrestrial sphere, said globe being mounted for rotation about its inclined polar axis; a stationary vertical member disposed within the globe at the central vertical axis thereof, a movable member mounted for rotation on said stationary member about said vertical axis, an opaque screen carried by said movable member and movable therewith about said vertical axis, a light source positioned in said globe at one side of said screen and mounted on said stationary member so that said screen is movable on its axis about said light source whereby the latter illuminates only one of said chambers, said globe having an opening at one end of said polar axis thereof and said screen and light source being insertable into said globe through said opening, said opening being smaller than said screen and said screen being formed of flexible material whereby it is contractable to a size sufficiently small to enable it to be inserted through said opening and resiliently expansible automatically within the globe to form said light seal, and means accessible externally of the globe for turning said screen about said vertical axis, said screen-turning means being operatively connected to said movable member.

13. A device of the character described for use in a hollow transulcent globe simulating the terrestrial sphere, said device comprising a stationary member adapted to be disposed within the globe, a movable member mounted on said stationary member for rotation about a vertical axis, an opaque screen carried by said movable member and movable therewith about said vertical axis, said screen dividing the interior of the globe into two chambers in each position of the screen, and means carried by said stationary member for supporting a lamp at one side of said screen for illuminating one of said chambers of the globe.

14. A device of the character described for use in a hollow translucent globe simulating the terrestrial sphere, said device comprising a stationary member adapted to be disposed within the globe, a movable member mounted on said stationary member for rotation about a vertical axis, an opaque screen carried by said movable member and movable therewith about said vertical axis, said screen dividing the interior of the globe into two chambers in each position of the screen, and means carried by said stationary member for supporting a lamp at one side of said screen for illuminating one of said chambers of the globe, said screen being formed of flexible material whereby it is contractable for insertion into the globe through an opening of smaller diameter than that of the screen.

15. A device of the character described for use in a hollow translucent globe simulating the terrestrial sphere, said device comprising an opaque screen, means for mounting said screen for rotation within the globe about a vertical axis at the center of the globe, said screen dividing the interior of the globe into two chambers in each position of the screen, and means for illuminating one of said chambers of the globe, said screen being contractable for insertion into the globe through an opening of smaller diameter than that of the screen.

16. A device of the character described for use in a hollow translucent globe simulating the terrestrial sphere, said device comprising an opaque screen, means for mounting said screen for rotation within the globe about a vertical axis at the center of the globe, said screen dividing the interior of the globe into two chambers in each position of the screen, and means for illuminating one of said chambers of the globe, said illuminating means comprising a lamp mounted independently of said screen, whereby said lamp is insertable in and removable from the globe independently of said screen.

NOEL CONCORDET.

REFERENCES CITED

The following references are of record in the file of this patent:

UNITED STATES PATENTS

| Number | Name | Date |
|---|---|---|
| 1,515,135 | Alexander | Nov. 11, 1924 |

FOREIGN PATENTS

| Number | Country | Date |
|---|---|---|
| 836,450 | France | Oct. 17, 1938 |